(12) United States Patent
Kress

(10) Patent No.: US 6,555,049 B1
(45) Date of Patent: Apr. 29, 2003

(54) STEEL MANUFACTURING FACILITY AND METHOD

(75) Inventor: Edward S. Kress, Brimfield, IL (US)

(73) Assignee: Kress Corporation, Brimfield, IL (US)

( * ) Notice: Subject to any disclaimer, the term of this patent is extended or adjusted under 35 U.S.C. 154(b) by 0 days.

(21) Appl. No.: 09/702,668

(22) Filed: Nov. 1, 2000

Related U.S. Application Data

(60) Provisional application No. 60/178,931, filed on Feb. 1, 2000.

(51) Int. Cl.⁷ .............................................. C21B 13/00
(52) U.S. Cl. ..................... 266/44; 266/143; 266/197; 266/900
(58) Field of Search ................ 266/900, 901, 266/197, 199, 142, 143, 44

(56) References Cited

U.S. PATENT DOCUMENTS

| | | | | |
|---|---|---|---|---|
| 722,425 A | * | 3/1903 | Hulett | 266/197 |
| 1,081,671 A | | 12/1913 | Kalenborn et al. | |
| 2,824,862 A | | 2/1958 | Kaiser | 294/69 |
| 3,253,723 A | * | 5/1966 | Calderon | 266/901 |
| 3,258,138 A | * | 6/1966 | Keen | 214/35 |
| 3,576,319 A | * | 4/1971 | Michaels | 266/900 |
| 3,834,568 A | | 9/1974 | Larson et al. | 214/307 |
| 4,020,960 A | | 5/1977 | Louis et al. | 214/390 |
| 4,023,784 A | * | 5/1977 | Wallace | 266/216 |
| 4,122,961 A | | 10/1978 | Kress | 214/313 |
| 5,098,251 A | | 3/1992 | Kress et al. | 414/458 |
| 5,595,470 A | | 1/1997 | Berkey et al. | 414/495 |
| 6,024,912 A | * | 2/2000 | Wunsche | 266/901 |

FOREIGN PATENT DOCUMENTS

| | | |
|---|---|---|
| DE | 24 39 941 A1 | 3/1976 |
| EP | 0 006 398 A | 9/1980 |
| FR | 1 491 690 A | 11/1967 |
| WO | WO 96/00877 | 11/1996 |

OTHER PUBLICATIONS

Copy of Partial International Search Report, dated Nov. 2, 2001, 4 pages; from related PCT Application No. PCT/US 00/41756.

English language Abstract for above reference B1, DE 24 39 941 A1. Mar. 1976.

Patent Abstracts of Japan vol. 1996, No. 6, Jun. 28, 1996 & JP 08 039236 A (Shinto Dasutokorekutaa KK).

PCT International Search Report issued in PCT /US00/ 41756, Dec. 3, 2002.

* cited by examiner

*Primary Examiner*—Scott Kastler
(74) *Attorney, Agent, or Firm*—Marshall, Gerstein & Borun

(57) ABSTRACT

A steel manufacturing facility and method are disclosed which utilize ground mobile equipment, as opposed to overhead cranes. At least one material container is loaded with a steel making product and picked up with a transport vehicle that is movable throughout the facility and adapted for various uses within the facility. The material container is placed within an interior chamber of a furnace coupling shell assembly utilizing the vehicle such that the material container is supported by a support mechanism of the apparatus. The shell assembly and the material container are moved together to the furnace utilizing the vehicle. A bottom opening of the shell assembly is positioned over the top opening of the furnace utilizing the vehicle. The furnace is then charged with the steel making product through the top opening. The material container and shell assembly are then removed together from above the furnace using the vehicle and then the furnace can be operated.

37 Claims, 12 Drawing Sheets

STEEL MANUFACTURING FACILITY AND METHOD

RELATED APPLICATION DATA

This application is related to co-pending U.S. provisional patent application Serial No. 60/178,931, which was filed on Feb. 1, 2000 and entitled "Steelmaking Shop."

FIELD OF THE INVENTION

The invention relates generally steel manufacturing facilities, and more particularly to a steel manufacturing facility that melts steel, refines steel, and casts steel into slabs, blooms, or billets, without the use of overhead production cranes. All production movements are done by mobile equipment.

BACKGROUND OF THE INVENTION

All previous steel manufacturing facilities have used heavy overhead cranes to move scrap charged buckets and steel filled refractory lined ladles from station to station during processing within the steel plant. This method requires multiple overhead crane bays and multiple cranes in each bay. Cranes by their nature restrict free flow of material between stations because the booms and support structures or cables physically interfere with the spaces above and between the stations. Cranes simply cannot pass by each other within the plant.

Even with multiple bays and multiple cranes, steel manufacturing facilities quite often are encumbered by not having overhead cranes in the right place at the right time. In addition, overhead cranes are very expensive to purchase, maintain and operate. Also, overhead cranes are very heavy. Due to their weight, such cranes require massive structures for support and massive footing for the many vertical support columns. These support structures and footings are also very expensive to install and maintain. Furthermore, when a crane is out of service for repair and maintenance it can also restrict free movement of material, thereby reducing output of the shop. An overhead crane in need of repair or maintenance cannot simply be moved out of the way of other operating cranes and cannot be easily disassembled.

Another problem with existing steel manufacturing facilities is that an enormous amount of emissions are generated during the steel making process. When overhead crane cables are suspending a scrap bucket within the facility, there is no practical way to contain the tremendous emissions that are generated when the scrap falls into the molten slag and steel in the bottom of the melting furnace.

There is a need for steel manufacturing equipment and facilities that solve these and other problems associated with the steel making process. Features and advantages are inherent in the disclosed equipment, facility and method or will become apparent to those skilled in the art from the following detailed description and its accompanying drawings.

DESCRIPTION OF THE PREFERRED EMBODIMENTS

A steel manufacturing facility and method are disclosed herein that reduce or eliminate the need for overhead cranes. The facility includes a number of components adapted to take the place of overhead cranes within such a facility. The components and method provide for mobility of material within the facility and for adaptability of the facility layout. The components and method also help to reduce or eliminate emissions within the facility that are generated when manufacturing steel.

Figure 1:
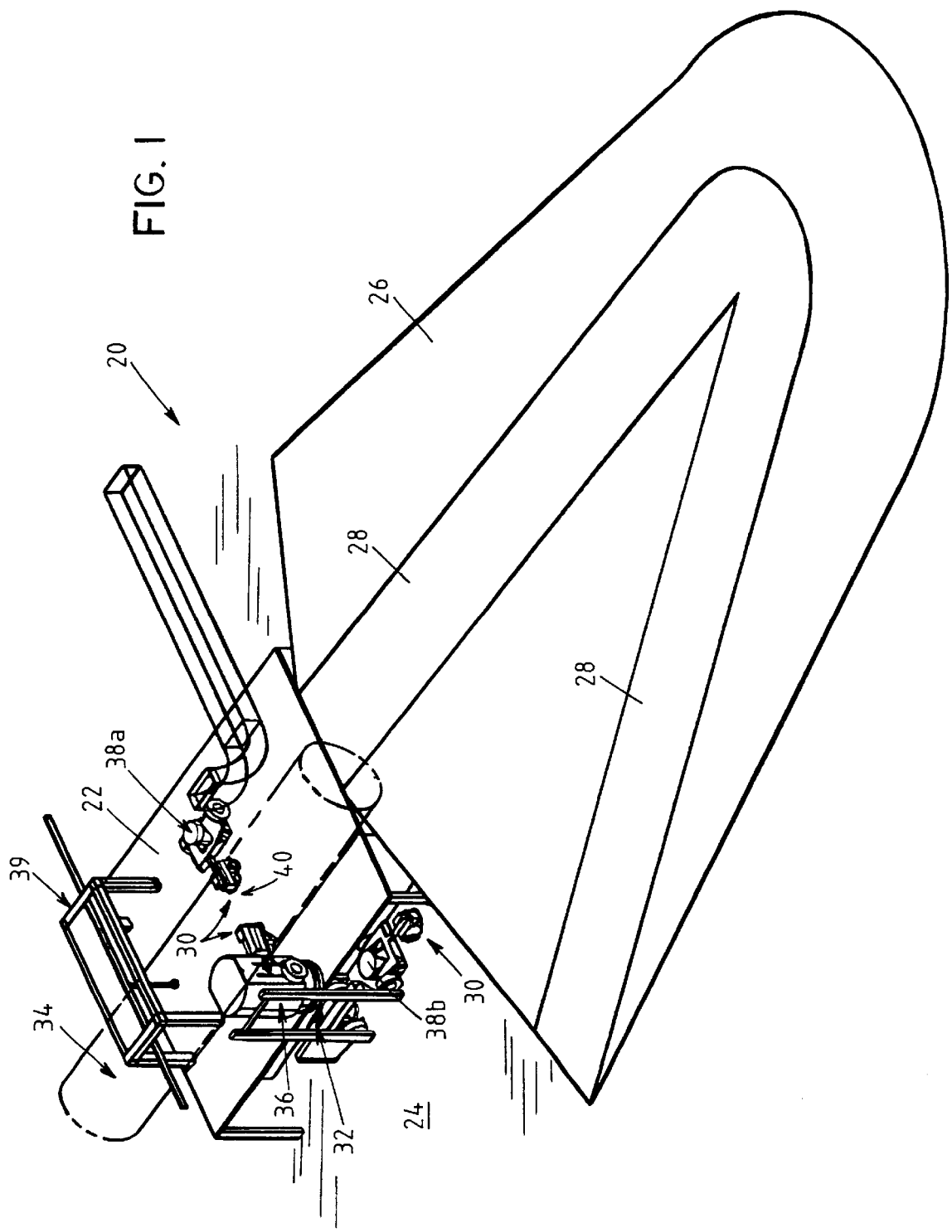
FIG. 1 is an elevation in perspective of one example of a steel manufacturing facility constructed according to the teachings of the present invention.

Referring now to the drawings, FIG. 1 is an elevation in perspective of a portion of a steel manufacturing facility 20 constructed according to the teachings of the invention. In general, the facility 20 incorporates an elevated working surface 22 or charging surface disposed above a ground surface 24. A ramp 26 has a ramp surface 28 that provides vehicle and equipment access between the ground surface and the elevated working surface. The facility 20 also has one or more transport vehicles 30 as described in greater detail below and adapted for moving equipment and material throughout the facility 20 according to the teachings of the invention. The facility 20 also has a furnace 32 positioned beneath the elevated working surface or charging surface 22 and an emissions collector 34 positioned above and spaced from the elevated working surface. The facility 20 also incorporates one or more furnace coupling or shell assemblies 36 that can selectively couple the furnace 32 to the collector 34. Steel material containers 38 such as scrap buckets (38a in FIG. 1) or steel ladles (38b in FIG. 1) are also provided for carrying steel making material throughout the facility and for cooperating with the shell assembly 36 and furnace 32 as described below according to the teachings of the invention. FIG. 1 also illustrates a floor supported gantry crane 39 used for moving material to repair, replace or maintain components such as the furnace, material containers and the like within the manufacturing facility.

Figure 2:
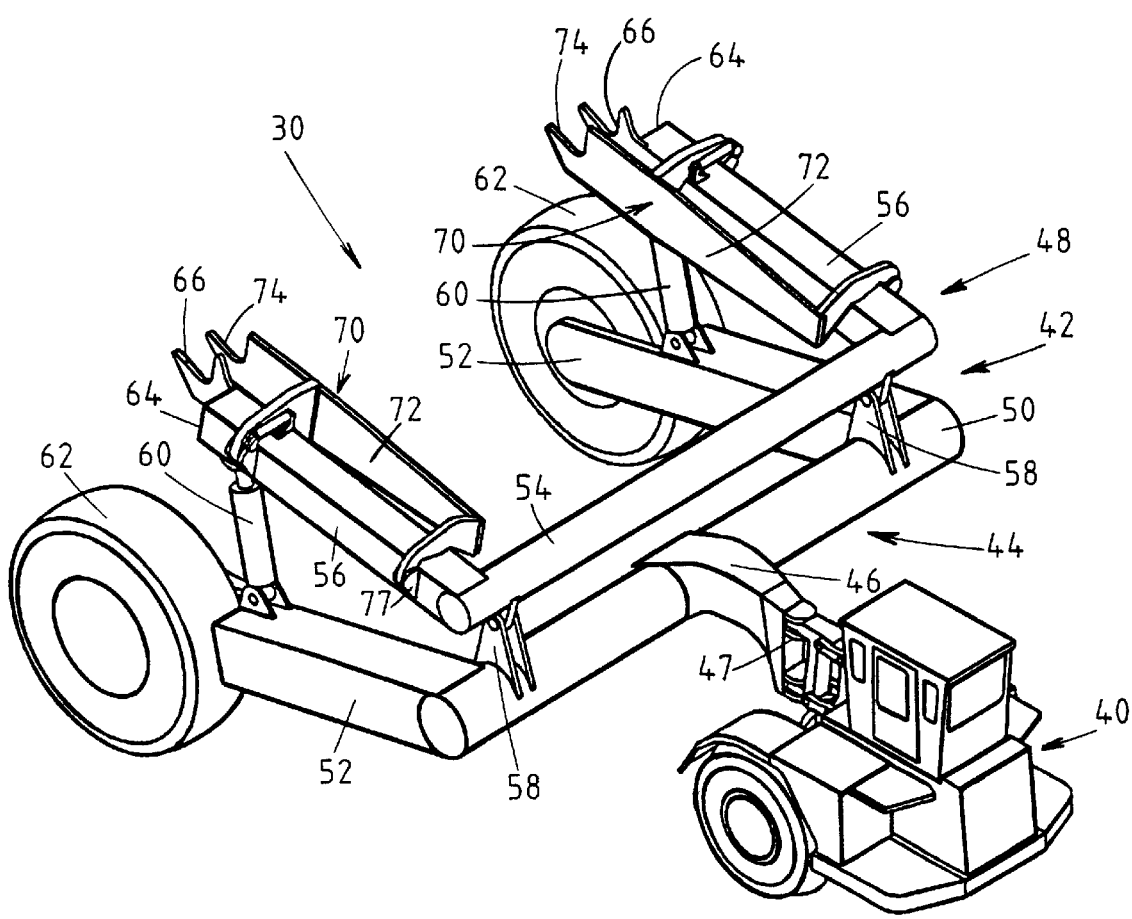
FIG. 2 is a schematic illustration of a vehicle constructed in accordance with the teachings of the invention for handling and, transporting material in a steel manufacturing facility.
Figure 3:
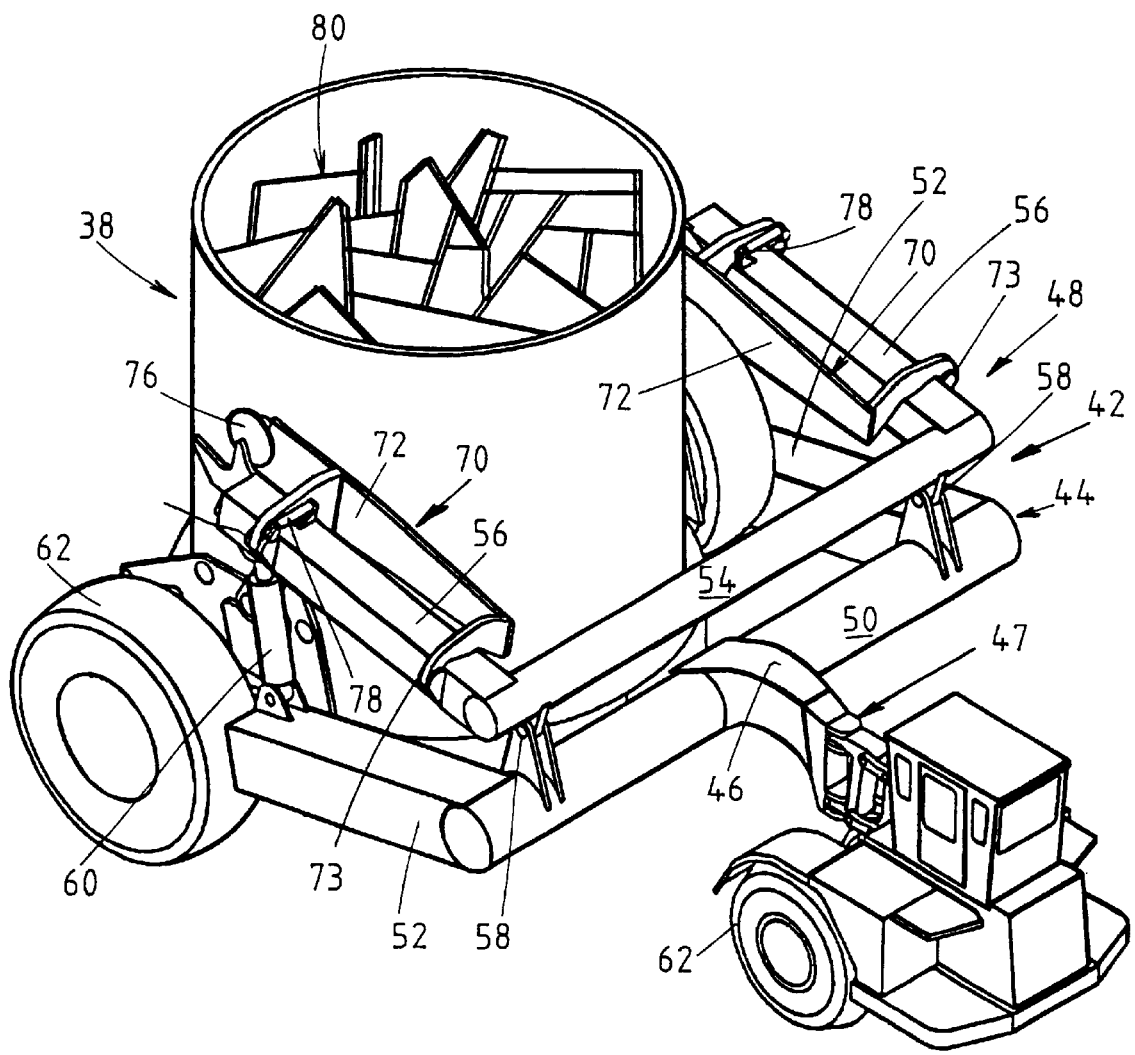
FIG. 3 illustrates the vehicle of FIG. 2 carrying a material container in the form of a scrap bucket.

The transport vehicle 30 constructed in accordance with the teachings of the invention is shown in FIGS. 2 and 3 for handling and transporting material containers 38 such as scrap buckets or steel ladles and for transporting shell assemblies 36 and the like within a facility 20. In the present example, the vehicle includes a prime mover 40 as is known in the art and a wheeled frame assembly 42. The frame assembly 42 has a lower main frame 44 with a centrally located goose neck 46 which is pivotably joined at a joint 47 to the prime mover 40 in a conventional fashion. The prime mover and articulating frame construction described herein is one of several possible constructions for the vehicle 30. The vehicle can also be of a conventional rigid or fixed frame construction wherein the wheels can turn to maneuver the vehicle similar to a car.

A lift frame 48 is pivotably mounted on the main frame 44. As shown in FIGS. 2 and 3, both the lift frame 48 and the main frame 44 are generally U-shaped structures. The main frame 44 has a main frame cross-member 50 arranged transverse to the vehicle and a pair of spaced apart main frame sections 52 arranged perpendicular to and extending rearward from opposite ends of the cross-member 50. The lift frame 48 similarly has a transversely arranged cross-member 54 and a pair of lift sections 56 arranged perpendicular to and extending rearward from opposite ends of the cross-member 54. The respective sections and cross-members cooperate to define the U-shaped lift frame 48 and main frame 44. The lift frame 48 is pivotably joined to the main frame 44 at two pivot points 58 positioned on opposite sides of the goose neck 46 on the main frame cross-member 50. The lift frame 48 can pivot upward and downward relative to the main frame about the pivots 58.

Lift cylinders 60 are mounted on the wheeled frame assembly 42 adjacent and forward of the wheels 62. The lift cylinders 60 are coupled to the lift frame 48 such that extension of the cylinders 60 causes the rearmost end of the lift frame 48 to pivot upward relative to the main frame 44 and retraction of the cylinders causes the lift frame to pivot downward relative to the main frame.

The vehicle 30 is adapted to lift and carry either a material container 38 (scrap bucket, steel ladle or the like) or a shell assembly 36, or both, each of which is described in greater detail below. Hereinafter, the term "material container 38" is used to refer to a scrap bucket, steel ladle or other steel making material container. As shown in the drawings, a scrap bucket is described as the exemplary material container 38. Similarly, the exemplary process described herein is the process of charging a furnace with scrap steel loaded in a scrap bucket. However, the material container 38 is not to be limited herein to only such a container.

To enable the vehicle 30 to lift and carry a shell assembly 36, distal ends 64 of the lift sections 56 are provided with a pair of first coupling devices or carry hooks 66 in the present example. In this example, the coupling devices 66 are rigidly coupled to the distal ends 64 of the lift sections 56 and are each sized to cooperate with a corresponding first trunnion 68 carried on opposite sides of the shell assembly 36.

To enable the vehicle 30 to lift and carry a material container 38, the vehicle is provided with a retractable second coupling device 70. As shown in FIGS. 2 and 3, the coupling device 70 has a pair of hook plates 72 that are pivotably mounted at pivots 73 for rotation about the lift frame sections 56 of the lift frame 48. Each hook plate 72 includes a second hook 74 at its distal end which is sized to receive a corresponding second trunnion 76 of the material container 38. An actuating cylinder 78 is mounted on each side of the lift frame sections 56 for pivoting or rotating the corresponding hook plates 72 between a retracted position (FIG. 6) and an extended position (FIGS. 2 and 3). When in the extended position, the hook plates 72 are located to engage the second 76 trunnions of the material container 38. When in the retracted or storage position, the hook plates 72 are moved out of the way such that the lift frame 48 can be maneuvered around a shell of the shell assembly 36 so that the carry hooks 66 can engage the first trunnions 68.

In use, the vehicle 30 picks up the material container 38, such as a scrap bucket in a remote scrap yard, for example, where the bucket is filled with scrap steel or other steel making material 80 by material handlers (not shown). The vehicle then transports the bucket 38 into a melt shop, for example, of the facility 20 and places the container 38 inside a shell assembly 36.

Figure 4:
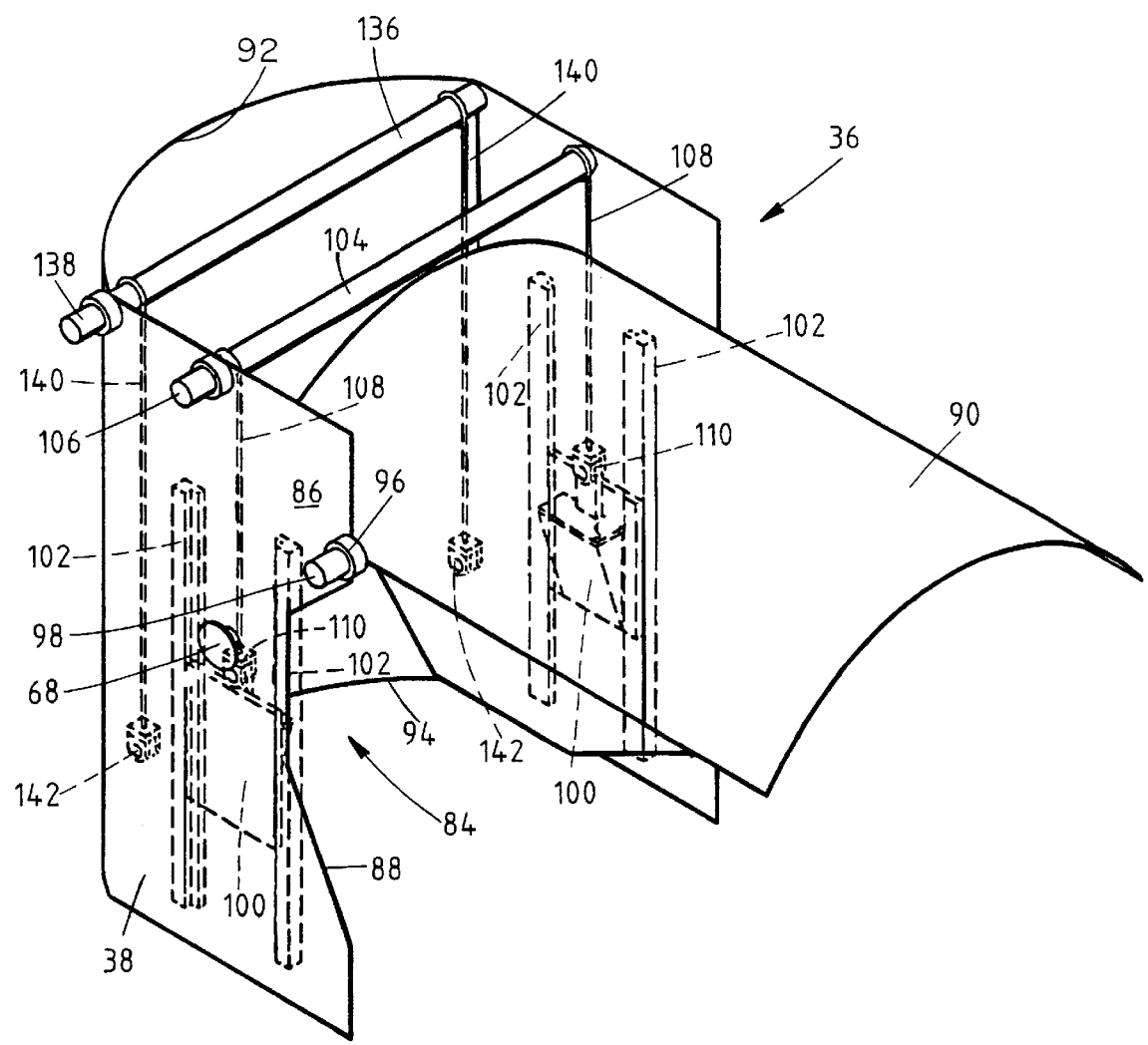
FIG. 4 illustrates a shell constructed in accordance with the teachings of the invention and showing a shell door in an open position.
Figure 5:
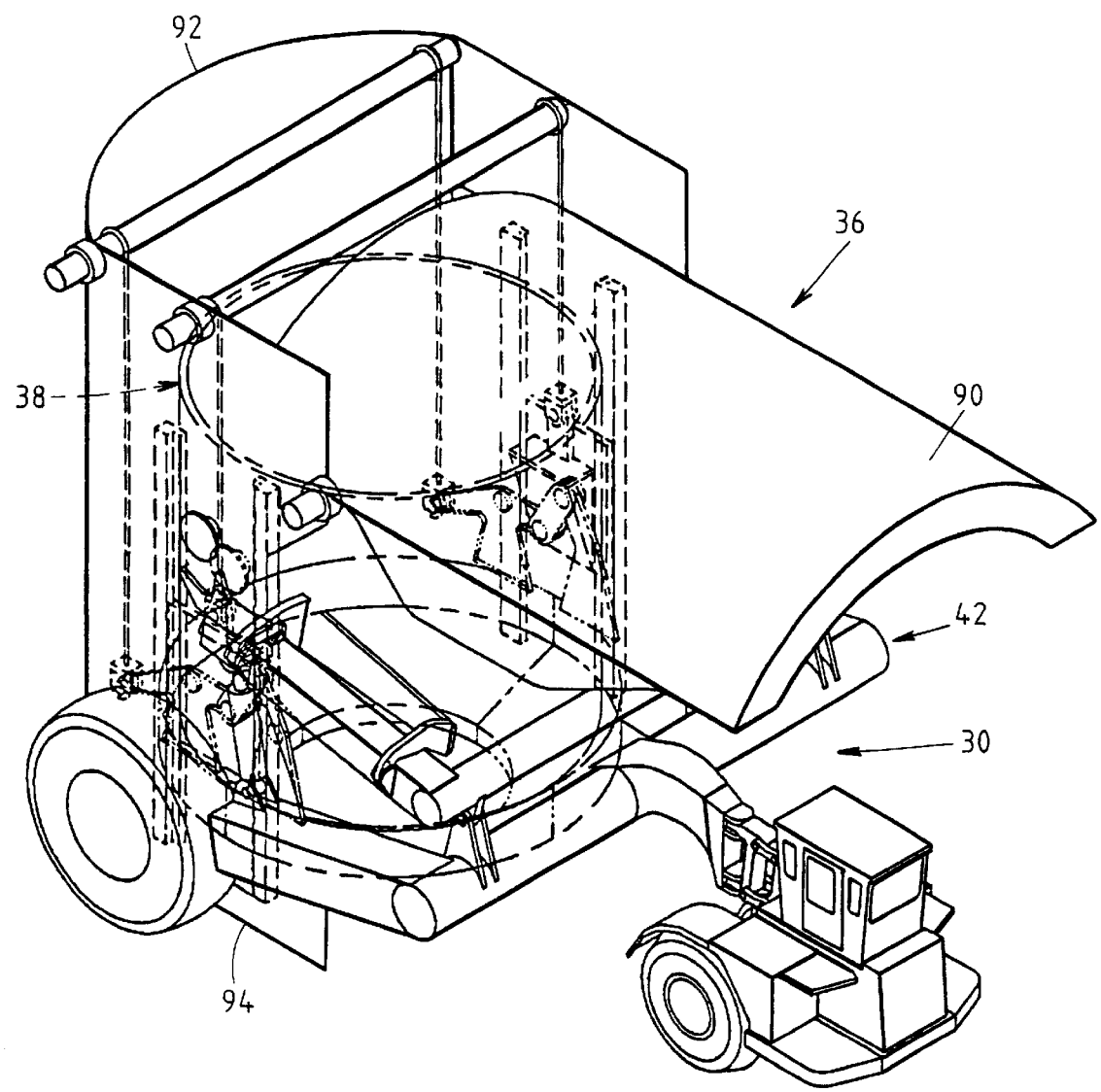
FIG. 5 shows the vehicle of FIG. 2 placing the scrap bucket into the shell of FIG. 4.
Figure 6:
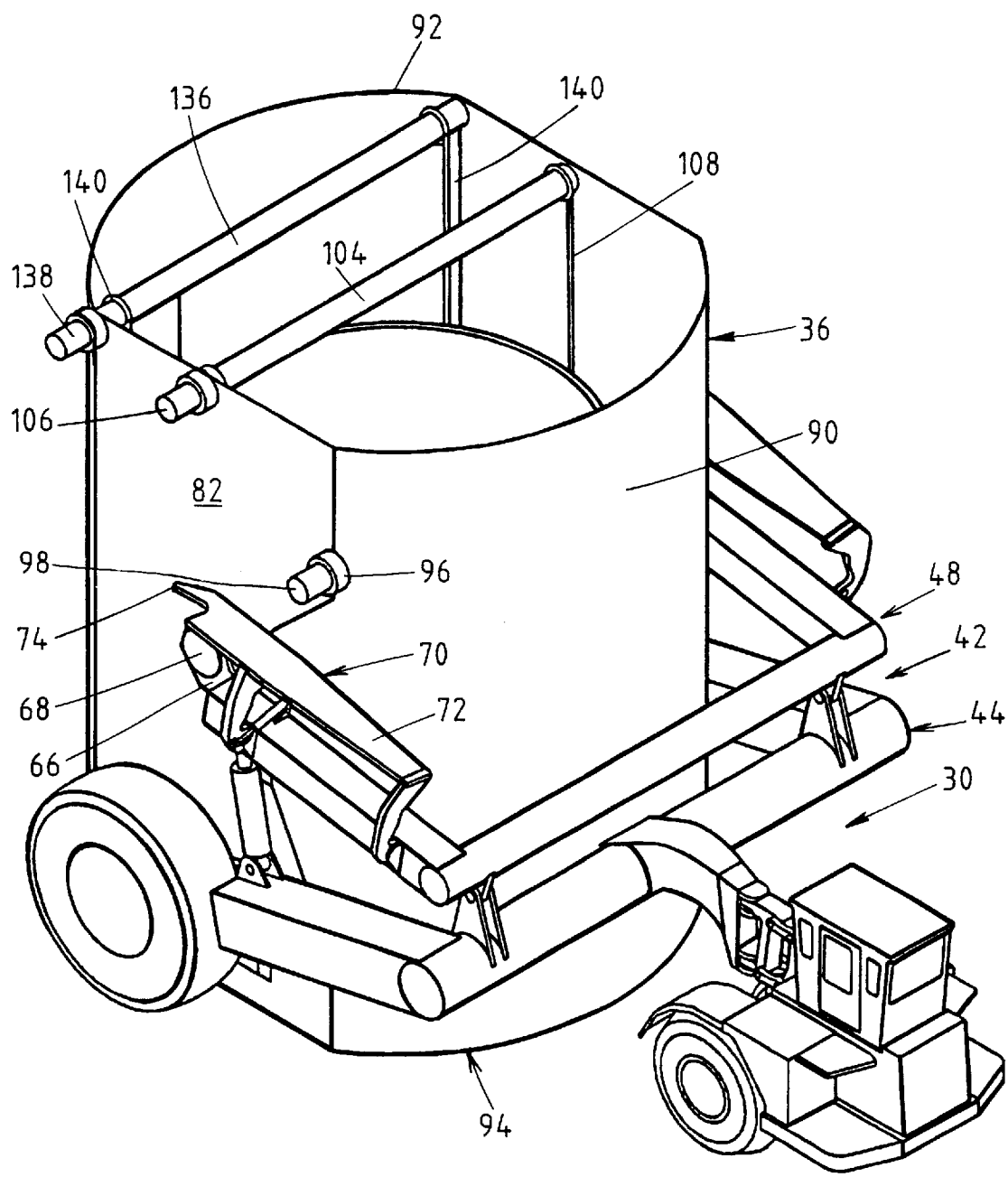
FIG. 6 shows the vehicle of FIG. 2 transporting the shell of FIG. 4 with the scrap bucket inside.
Figure 7:
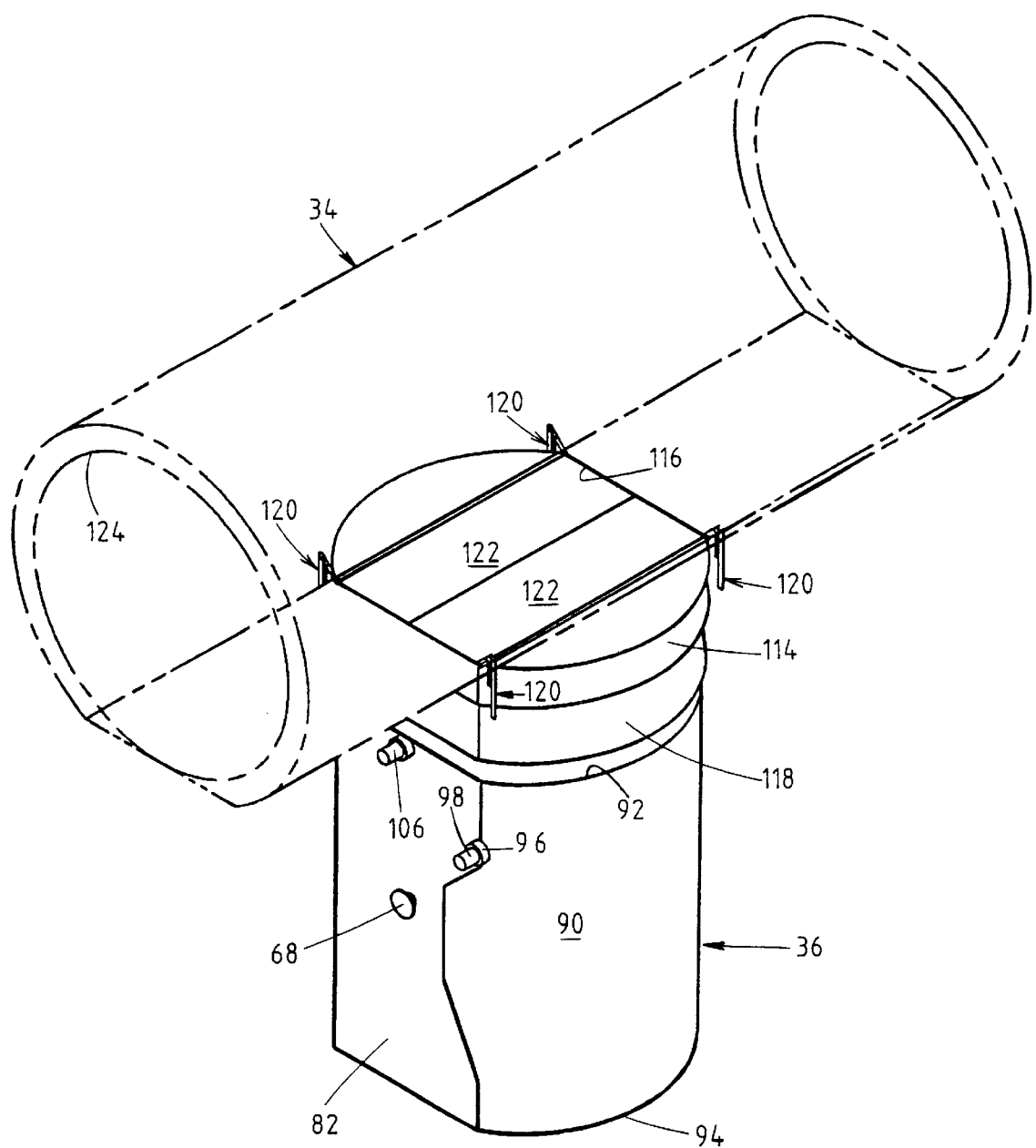
FIG. 7 shows the shell door closed, with the shell positioned under a raised shell cover and with emission collector duct doors closed.

The shell assembly 36 constructed according to one example of the teachings of the invention is shown in FIGS. 4, 5 and 6. The shell assembly 36 has a cylindrical shell 82 (FIG. 6) including a wall defining an interior chamber 84 and an exterior surface 86. The shell 82 also has an access opening 88 formed through the shell providing access into the interior chamber 84 and a movable access door 90 for selectively closing off the access opening. The shell also defines a top opening 92 and a bottom opening 94 in the apparatus 36. The shell access door 90 is pivotably carried on pivots 96 and is operable by a motor 98 for opening and closing the door relative to the access opening.

The shell also has a pair of support pads 100 carried one each on opposite sides of the shell 82 within the interior chamber 84. The supports pads 100 are each mounted between a pair of vertically oriented and spaced apart tracks 102 carried on the interior surface of the shell 82. The supports pads 100 are vertically slidable along the tracks 102. The shell 82 also includes a first overhead drum 104 spanning the shell near the top opening 92. A first motor 106 is coupled to the first drum 104 for rotating the drum in both directions about its longitudinal axis. A pair of first cables 108 are connected at one end to the drum 104 and depend downward within the interior chamber 84. A first free end 110 of each first cable 108 is connected to a respective one of the support pads 100. The motor 106 is operable to move the support pads 100 upward and downward via the cables 108 and rotation of the drum 104.

Figure 8:
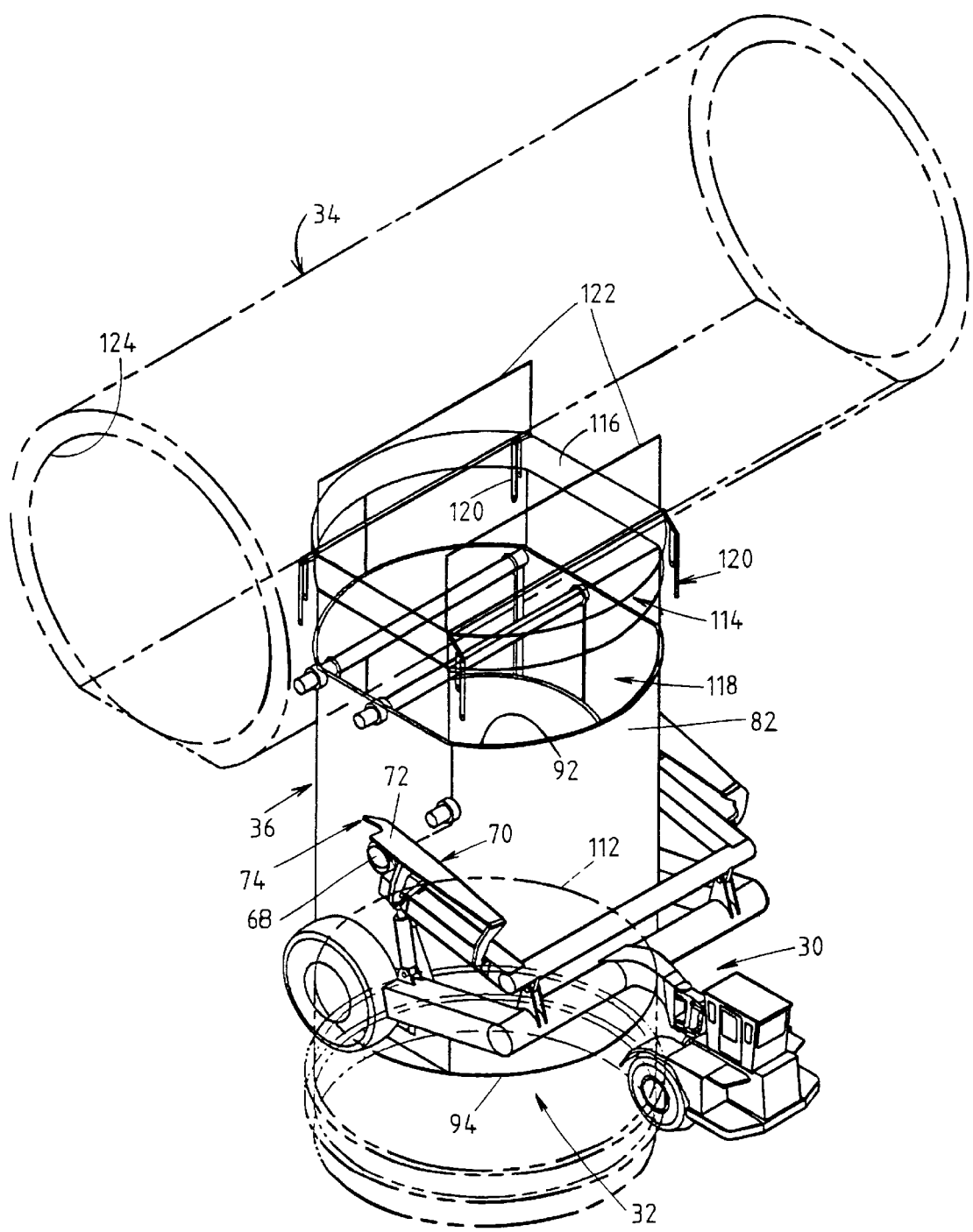
FIG. 8 shows the shell positioned on a furnace but still supported by the vehicle wherein the collector duct doors are opened and the shell cover is lowered over the shell.
Figure 9:
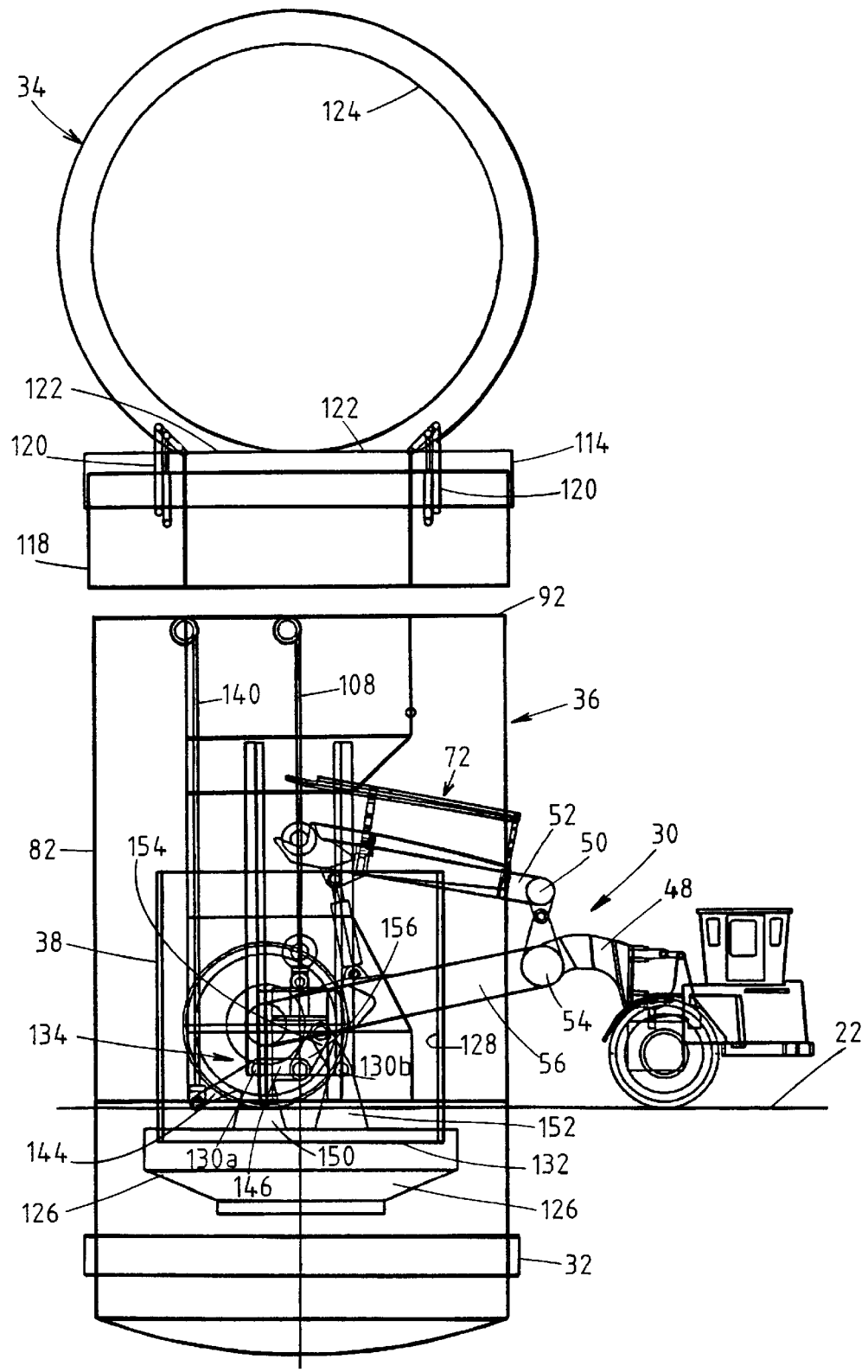
FIG. 9 shows the scrap bucket down in the furnace with a clam shell door closed.

In operation, the material container 38 is delivered by the vehicle 30 and placed on the support pads 100 through the access opening 98 with the access door 90 open. The vehicle 30 then releases the material container 38 and moves back from the shell 82. The shell access door 90 closes via actuation of the door motor 98 and seals the access opening. The hook plates 72 and hooks 74 that were supporting the material container are retracted. The shell assembly 36 is then picked up by the lift frame 48 and hooks 66 with the full material container inside, and then maneuvered to a position over a top opening 112 of the furnace 32, as shown in FIGS. 8 and 9. If necessary, the ramp 26 can be utilized either before or after picking up the shell assembly 36 in order to access the furnace top opening 112.

Figure 11:
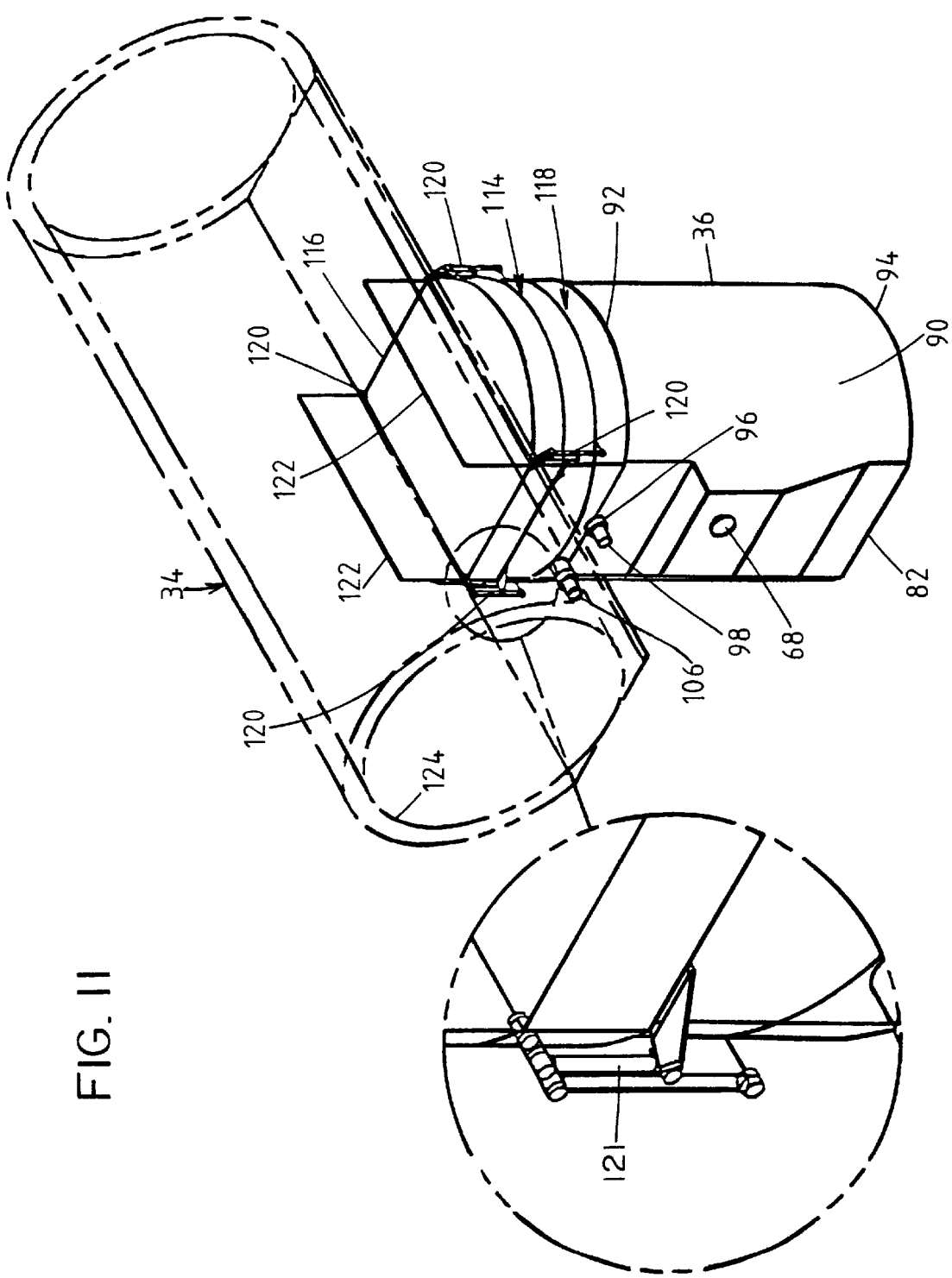
FIGS. 11 and 12 are enlarged views of the linkage for operating the emission collector doors of the emission collector shown in FIGS. 9 and 10.
Figure 12:
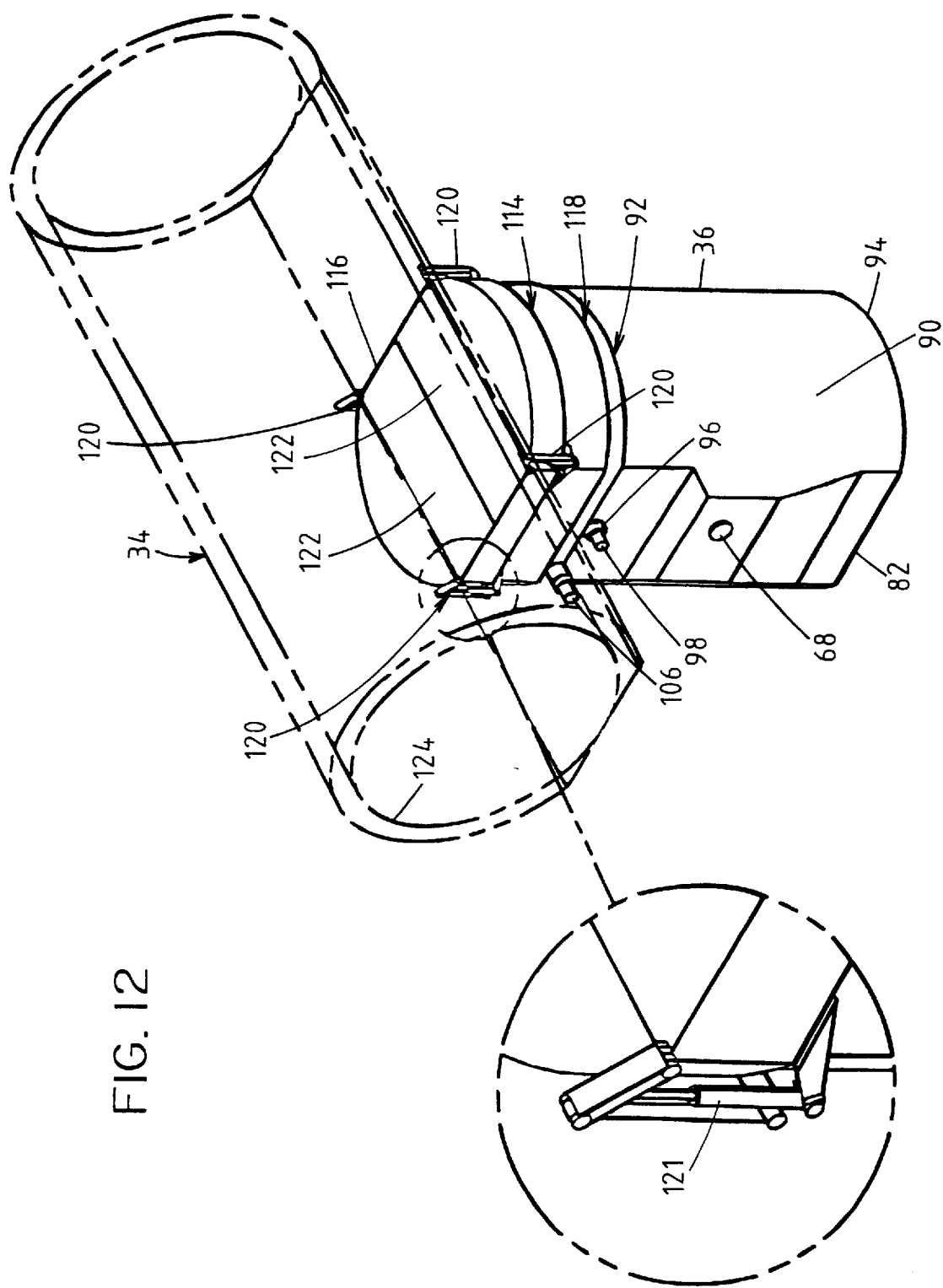

The emissions collector 34 is stationary and positioned above the furnace top opening 112. A stationary cover 114 extends downward from the collector and surrounds a collector duct opening 116. An extendable cover 118 can then be moved downward from the stationary cover 114 into sealed contact with the top opening 92 of the shell 82 as shown in FIGS. 7–10. Door actuators 120 each include an actuating cylinder 121 (FIGS. 11 and 12) for operating a pair of duct doors 122 that are movable relative to the duct opening 116 for opening and closing off the duct opening. The emissions collector includes an elongate duct 124 for guiding steel making process emissions from the facility to a desired location or treatment section (not shown).

The material container 38 is then lowered into the furnace 32 by the first cables 108 as shown in FIGS. 5 and 8 which in turn lowers the support pads 100. Lowering the material container 38 reduces the fall of the scrap material 80 into the pool of molten slag and steel within the furnace, thus significantly reducing emissions usually generated by charging the furnace with scrap material.

Figure 10:
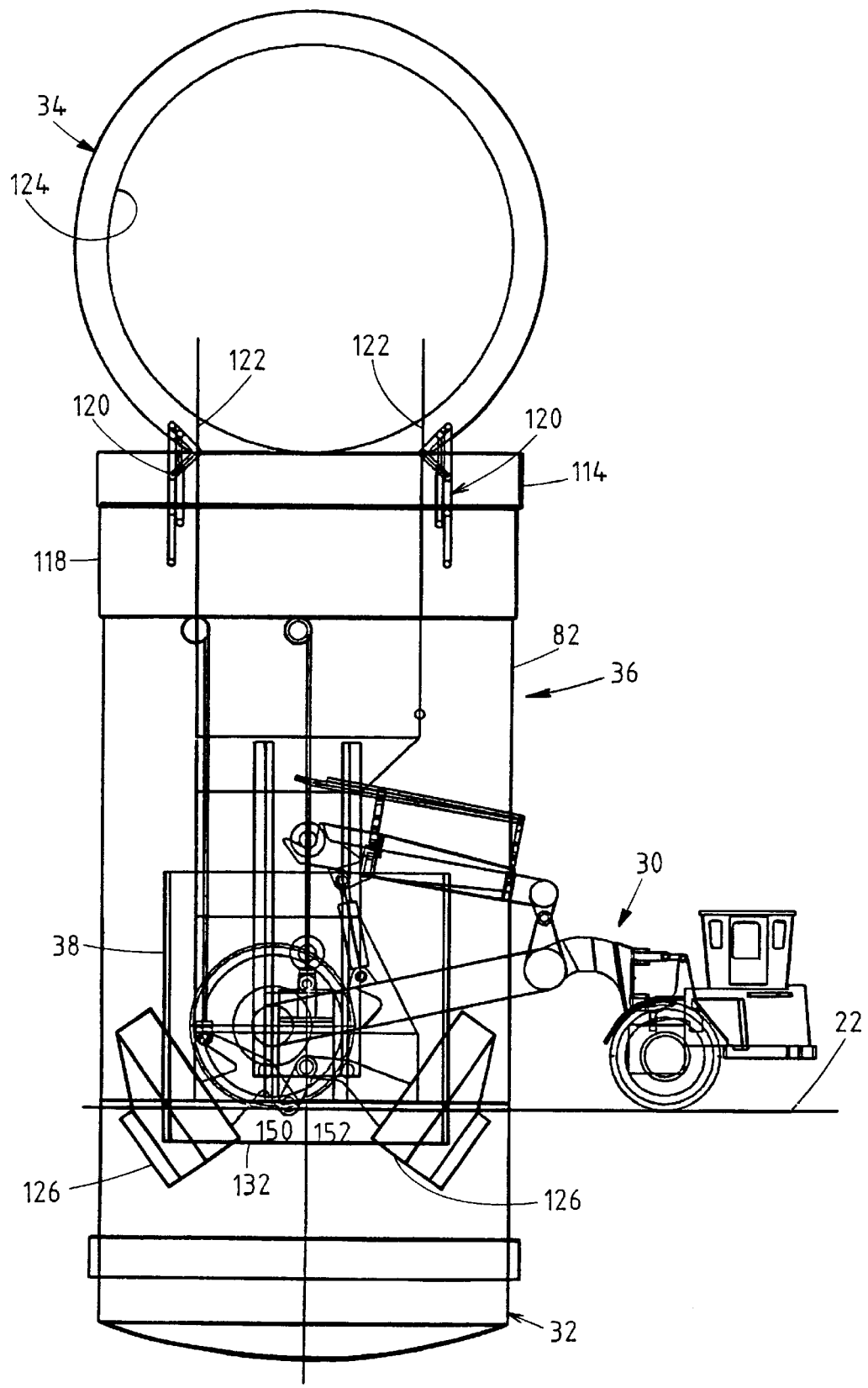
FIG. 10 shows the scrap bucket down in the furnace with the clam shell door opened.

As shown in FIGS. 9 and 10, the material container 38 has a pair of clam shell doors 126 depending from a cylindrical bucket wall 128. The doors 126 are pivotably supported by pivots 130*a* and 130*b* (described below) carried on the bucket wall. The doors 126 pivot toward and abut one another in a closed position as shown in FIG. 9. The doors pivot away from one another as shown in FIG. 10 to exposed a bottom opening 132 of the bucket. By opening the doors 126, the scrap material 80 held in the container 38 is deposited in the furnace to charge the furnace.

The bottom clamshell doors 126 (FIGS. 9 and 10) are opened and closed by a movable linkage 134 (FIGS. 5, 9 and 10). The linkage 134 is operated by a second part of the support mechanism for the material container 38 within the shell assembly 36. The mechanism includes a second drum 136 spanning the shell 82 near the top opening 92 that is also rotated in both directions by a second motor 138 about its longitudinal axis. A pair of second cables 140 are connected at one end to the drum 136 and wound around the drum by actuating the motor 138. A second free end 142 each second cable is connected to a drive link 144 of the linkage 134 on each side of the bucket. Each drive link 144 is coupled to a fixed link arm 146 on the opposite side of the pivot 130*a*. One of the doors is affixed to the drive link and link arm by a bracket 150 to thereby rotate about the pivot 130*a*. The other door 126 also has a bracket 152 connected at its own pivot 130*b* to the bucket. A link arm 154 extends from the bracket 152 beyond the pivot 130*b*. A drag link 156 is pivotally coupled between the link arms 146 and 154. Movement of the drive link 144 pivots one door 126 about its pivot 130*a* and via the linkage including the drag link 156 pivots the second door 126 about its pivot 130*b* simultaneously.

The linkage 134 moves up and down as a part of the material container 38, but can also move independently when required to open and close the material container bottom doors 126. Lowering the bucket 38 into the furnace 32 allows the scrap to fall into the furnace with as little drop as possible to minimize the generation of emissions. The bucket 38 can be lifted above the scrap 80 that has been placed in the furnace 32. The clamshell doors 126 can then be closed and the bucket 38 can be lowered again as required onto loose low density scrap 80 forcing it down into the furnace 32, if necessary. Power to actuate the functions (shell access door motor 98, linkage motor 138, bucket motor 106) of the shell 82 can be supplied internally or externally. Control of these functions is external. Similarly, the motros (not shown) for the extendable cover 118 and the duct doors 122 can also be provided internally or externally, though operated externally.

After charging the furnace 32, the container 38, shell assembly 36 and vehicle 30 pause for an appropriate time over the furnace top opening 112 until the emissions from dropping the scrap 80 into the furnace have subsided. The emission collecting duct doors 122 are then closed, the material container 38 is lifted back into the shell 82, the extendable cover 118 is lifted, and the vehicle 30 via the lift frame 48 lifts the shell 82 off the furnace 32 and moves it to the side. The vehicle can then set the bucket down and move away. The shell access door 90 is then opened. The vehicle next removes the material container 38 from the shell 82 and returns it to the scrap yard. The vehicle then returns to the melt shop with a full material container 38 to repeat the process again. For multiple charged heats, additional full scrap filled buckets 38 can be stored on the charging floor or elevated working surface 22 next to the shell 82 and furnace 32.

As shown in FIG. 1, the ramp 26 can be inexpensively built and can be designed to provide access to the melt shop floor for the transport vehicle 30 to charge a furnace 32 with scrap 80 haled in a scrap bucket 38*a* as described herein. It is also possible that the vehicle can move a steel ladle 38*b* throughout the facility, as well as to place a steel ladle on a caster. The floor supported gantry crane 39 is often required to supply parts and components for performing or assisting in normal repair, maintenance and replacement, as needed, of facility components, such as the furnaces, ladles, buckets, casters, vehicles and the like. The charging surface or elevated working surface 22 can be built to permit access beneath the charging surface for the vehicles and other shop equipment to maximize use of space within the facility.

In contrast to the existing facilities that use multiple bays and overhead cranes, in the disclosed facility, multiple mobile vehicles are preferably always on standby and can be maintained and serviced in external shops at a very low capital and operating cost relative to cranes and their supporting structure.

The disclosed steelmill or manufacturing facility solves the above noted problems of the existing crane oriented facilities. Since there are no restrictions to movement, additional furnaces, casters, ladle refining stations etc. can be added, in any number, at any time, at a relatively minor cost for component support structures and mobile equipment. For the furnace component, caster component, etc. being added, only the basic component cost will be incurred. The mobile equipment will have free access to all components no matter the number or location. In addition, the internal working of the shop has a much improved working environment because the use of mobile equipment allows scrap charging emissions to be contained.

Exemplary embodiments for various components and structures are disclosed and described herein. These embodiments can vary and yet fall within the scope of the invention. For example, the material container linkage can vary and yet function to open and close the bottom opening as desired and cooperate with a support mechanism of the shell assembly. Similarly, the support mechanism components can also vary considerably and yet raise and lower the material container and open and close the bucket doors. The frame assembly construction and the coupling devices on the lift frame can also vary and yet support, lift and lower the material container and the shell assembly. The emissions collector duct and components and the various doors and operating mechanisms can also vary within the scope of the invention.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A steel manufacturing facility comprising:
   a ground surface;
   an elevated working surface;
   a transport vehicle freely movable within the steel manufacturing facility about both the ground surface and the elevated working surface;

a furnace having a chamber for holding steel making material and a top opening for loading the steel making material into the chamber, the top opening positioned a distance above the ground surface and accessible from the elevated working surface; and a ramp having a gradually inclined ramp surface extending between the ground surface and the elevated working surface to provide access to the top opening for the transport vehicle carrying the steel making material within the facility.

2. A steel manufacturing facility according to claim 1, further comprising:

an emissions collector positioned above and spaced from the top opening of the furnace.

3. A steel manufacturing facility according to claim 2, further comprising:

a closable cover for a collector opening into the emissions collector to selectively permit emissions from entering the emissions collector through the collector opening and to prevent emissions from escaping the emissions collector through the collector opening.

4. A steel manufacturing facility according to claim 1, wherein the elevated working surface is supported above the ground surface permitting equipment to move beneath the elevated working surface and on the elevated working surface.

5. A steel manufacturing facility comprising:

at least one furnace having a top opening providing access to a processing chamber of the furnace;

at least one material container adapted to hold a steel making product therein and to be selectively movable throughout the facility, the material container having a a container wall, an open top and a bottom opening that can be opened and closed;

at least one shell assembly that is selectively movable throughout the facility, the shell assembly having a shell with a cylindrical wall defining an interior chamber, a bottom opening adapted to removably couple with the furnace, a closable access opening through the wall to the interior chamber, and a support mechanism adapted to removably support the material container within the interior chamber of the shell; and at least one vehicle having a plurality of wheels and a prime mover for operating the vehicle throughout the facility, the vehicle having a lift frame adapted to lift and support each of the material container and the shell assembly either together or separately, wherein the vehicle can be moved to position the shell assembly over the furnace.

6. A steel manufacturing facility according to claim 5, further comprising:

an elevated working surface disposed above a ground surface of the facility, the furnace top opening being positioned above the ground surface and accessible from the elevated working surface; and a ramp having a ramp surface interconnecting the ground surface and the elevated working surface.

7. A steel manufacturing facility according to claim 5, further comprising:

a pair of container trunnions extending one each from opposite sides of the material container wall; and a hook mechanism carried on the vehicle lift frame adapted to lift and carry the material container via the container trunnions.

8. A steel manufacturing facility according to claim 5, further comprising:

a pair of shell trunnions extending from opposite sides of the shell assembly; and a hook mechanism carried on the vehicle lift frame adapted to lift and carry the shell assembly via the shell trunnions.

9. A steel manufacturing facility according to claim 5, wherein the vehicle lift frame further comprises:

a frame assembly including a pair of spaced apart main frame sections each having opposed first and second ends, a main frame cross-member oriented transverse to and interconnecting the main frame sections nearer the first ends, a pair of spaced apart lift frame sections each having one end pivotally coupled to the frame assembly and an opposite free end that is raised and lowered by the lift mechanism, and a container receiving gap provided between the second ends of the main frame sections and between the free ends of the lift frame sections.

10. A steel manufacturing facility according to claim 9, further comprising:

a lift frame cross-member extending between and interconnecting the one ends of the lift frame sections and wherein the lift frame cross-member is pivotally coupled to a portion of the main frame.

11. A steel manufacturing facility according to claim 9, wherein the main frame cross-member is coupled to the prime mover at an articulating joint.

12. A steel manufacturing facility according to claim 9, further comprising:

at least a pair of hydraulic cylinders, at least one cylinder positioned near the free end of each main frame section and the opposite end of a respective lift frame section and extending between the main frame section and the lift frame section, the cylinders operable to raise and lower the lift frame sections relative to the main frame sections.

13. A steel manufacturing facility according to claim 5, wherein the transport vehicle further comprises:

a pair of first coupling devices rigidly affixed to portions of the lift frame and adapted to engage corresponding first trunnions carried on the shell assembly; and a pair of second coupling devices movably carried on portions of the lift frame and adapted to engage corresponding second trunnions carried on the material container, the pair of second coupling devices being movable between an engagement position to engage the material container and a retracted position to permit the first pair of coupling devices to engage the shell assembly.

14. A steel manufacturing facility according to claim 5, further comprising:

an emissions collector disposed above the furnace top opening and having a collector opening adapted to connect with a top opening of the s hell assembly for receiving emissions from the furnace.

15. A steel manufacturing facility according to claim 14, further comprising:

a closable cover over the collector opening.

16. A steel manufacturing facility according to claim 5, wherein the support mechanism of the shell assembly further comprises:

a first motor carried by the shell; and at least a pair of first cables mounted within the shell, each cable of the pair having a proximal end in cooperation with the first motor and a free end depending toward the bottom opening of the shell and adapted to connect to and support the material container within the shell, the first motor being operable to raise and lower the first cable free ends.

17. A steel manufacturing facility according to claim 16, further comprising:

at least a first rotatable drum spanning the shell nearer a top end of the wall and being rotatable about a longitudinal axis by the first motor to raise and lower the first cables.

18. A steel manufacturing facility according to claim 16, further comprising:

two pair of spaced apart slide tracks, one each carried on opposite sides of the shell wall;

a material container support pad slidably carried between each pair of slide tracks, each support pad connected to one of the cable free ends and being vertically movable via the cables between the slide tracks.

19. A steel manufacturing facility according to claim 16, further comprising:

a second motor carried by the shell; and at least a pair of second cables mounted within the shell, each second cable of the pair having a proximal end in cooperation with the second motor and a free end depending toward the bottom opening of the shell and adapted to connect to a door opening linkage of a material container housed within the shell, the motor being operable to raise and lower the second cable free ends in conjunction with the first motor and first cable free ends and also independent of the first motor and first cable free ends.

20. A steel manufacturing facility according to claim 19, further comprising:

a second drum spanning the shell nearer the top end of the wall and being rotatable about a longitudinal axis by the second motor to raise and lower the second cables.

21. A steel manufacturing facility according to claim 5, wherein the material container further comprises:

a generally cylindrical vertically oriented wall defining the open top and the bottom opening, and also defining a bucket interior and an exterior wall surface; and a pair of opposed clam shell doors movably covering the bottom opening, each clam shell door pivotally supported on opposite sides of the wall exterior surface and adapted to pivot toward and abut the other clam shell door to close the bottom opening and to pivot away from one another to open the bottom opening.

22. A steel manufacturing facility according to claim 21, further comprising:

brackets supporting each clam shell door on each side of the wall exterior surface of the material container; and a linkage assembly interconnecting the brackets of each clam shell door on each side of the wall exterior surface, the linkage being operable to open and close the doors in unison.

23. A method of making steel in a manufacturing facility having at least one furnace with a top opening, the method comprising the steps of:

loading at least one material container with steel making product;

picking up the loaded material container with a vehicle that is movable throughout the facility;

placing the material container within an interior chamber of a furnace coupling shell assembly utilizing the vehicle such that the material container is supported by a support mechanism of the shell assembly;

moving the shell assembly and material container to the furnace utilizing the vehicle;

positioning a bottom opening of the shell assembly over the top opening of the furnace utilizing the vehicle;

charging the furnace with the steel making product through the top opening;

removing the material container and the shell assembly from above the furnace utilizing the vehicle; and operating the furnace.

24. A method according to claim 23, wherein the step of loading further comprises:

loading scrap steel material into the material container.

25. A method according to claim 23, wherein the step of picking up further comprises:

hooking the material container with a hook mechanism and lifting the container with a lift frame assembly of the vehicle.

26. A method according to claim 23, wherein the step of placing further comprises:

opening an access door of the shell assembly and placing the material container in the interior chamber through an access opening exposed by the opened access door.

27. A method according to claim 23, wherein the step of placing further comprises:

resting the material container on slidable supports carried within the interior chamber.

28. A method according to claim 23, further comprising the steps of:

releasing the material container once placed within the interior chamber; and picking up the shell assembly and material container utilizing the vehicle prior to the step of moving.

29. A method according to claim 23, wherein the step of positioning further comprises:

positioning a top opening of the shell assembly beneath a collector opening of an emissions collector disposed above the furnace.

30. A method according to claim 29, wherein the step of positioning further comprises:

moving the vehicle up a gradually inclined ramp surface to an elevated working surface adjacent the furnace top opening.

31. A method according to claim 23, further comprising the step of:

lowering the shell assembly onto the furnace top opening utilizing the vehicle after the step of positioning.

32. A method according to claim 23, further comprising the step of:

lowering the material container toward the furnace top opening within the shell assembly before the step of charging.

33. A method according to claim 32, wherein the step of lowering further comprises:

lowering the support mechanism within the shell assembly to lower the material container.

34. A method according to claim 23, wherein the step of charging further comprises:

opening a bottom door of the material container to drop the steel making material into the furnace through the top opening.

35. A method according to claim 34, wherein the step of charging further comprises:

opening the bottom door utilizing an apparatus carried by the shell assembly.

36. A method according to claim 34, wherein the step of charging further comprises:

further lowering the material container onto the steel making material within the furnace to assist in compacting the steel making material.

37. A method according to claim 23, further comprising the steps of:

opening an access door of an access opening in the shell assembly and placing the material container into the interior chamber through the access opening; and closing the access door of the shell assembly prior to the step of charging.

* * * * *